United States Patent [19]
Tsuboi et al.

[11] Patent Number: 5,317,416
[45] Date of Patent: May 31, 1994

[54] FACSIMILE APPARATUS WITH A PAGE PRINTER HAVING REDUCED MEMORY CAPACITY REQUIREMENTS

[75] Inventors: Toshio Tsuboi, Osaka; Munehiro Nakatani, Toyokawa; Shigenobu Fukushima, Yao, all of Japan

[73] Assignee: Minolta Camera Kabushiki Kaisha, Osaka, Japan

[21] Appl. No.: 719,832

[22] Filed: Jun. 24, 1991

[30] Foreign Application Priority Data

| Jun. 27, 1990 | [JP] | Japan | 2-168864 |
| Jun. 27, 1990 | [JP] | Japan | 2-168865 |
| Jun. 27, 1990 | [JP] | Japan | 2-168866 |
| Jun. 27, 1990 | [JP] | Japan | 2-168867 |
| Jun. 27, 1990 | [JP] | Japan | 2-168868 |
| Jun. 27, 1990 | [JP] | Japan | 2-168869 |
| Jun. 27, 1990 | [JP] | Japan | 2-168870 |

[51] Int. Cl.⁵ .................................................. H04M 1/40
[52] U.S. Cl. ................................... 358/444; 358/426
[58] Field of Search .............................. 358/443–444, 358/426, 261.1–261.4, 470

[56] References Cited

U.S. PATENT DOCUMENTS

| 4,262,309 | 4/1981 | Yamaguchi | 358/260 |
| 4,731,658 | 3/1988 | Koseki | 358/287 |
| 4,814,898 | 3/1989 | Arimoto et al. | 358/426 |
| 4,881,180 | 11/1989 | Nishiyama | 364/518 |
| 4,903,317 | 2/1990 | Nishihara et al. | 358/426 |
| 5,014,134 | 5/1991 | Lawton et al. | 358/426 |
| 5,068,745 | 11/1991 | Shimura | 358/444 |

*Primary Examiner*—Stephen Brinich
*Attorney, Agent, or Firm*—Willian Brinks Olds Hofer Gilson & Lione

[57] ABSTRACT

A facsimile apparatus having a page memory includes a memory having a capacity of at least one line data that is printed by a printer. The reception signal of the facsimile apparatus received and compressed is expanded for printing, and written into the memory. The printer prints the message received according to the written expanded data.

12 Claims, 21 Drawing Sheets

FIG.3

| METHOD | CONTENT |
|---|---|
| MH | ONE-DIMENSIONAL ENCODING OF DATA OF ALL SCAN LINES |
| MR | AFTER ONE-DIMENSIONAL ENCODING ONE SCAN LINE, TWO-DIMENSIONAL ENCODING OF CONTINUOUS SCAN LINES OF A MAXIMUM OF K-1 VALUE OF K =2 WHEN STANDARD RESOLUTION, K = 4 WHEN HIGH RESOLUTION |
| MMR | TWO-DIMENSIONAL ENCODING ALL SCAN LINES AT THE TIME OF ENCODING THE FIRST LINE, ASSUME AN IMAGINARY ALL WHITE LINE RIGHT BEFORE THE ENCODING LINE AS THE REFERRED LINE |

FIG.10
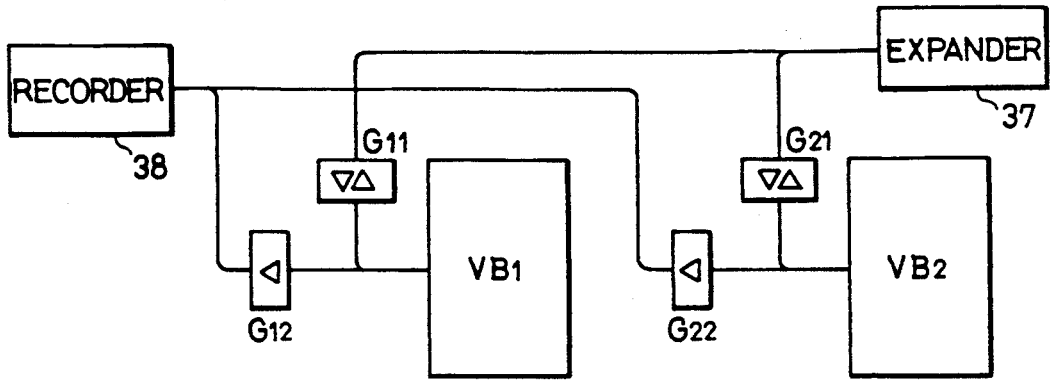
FIG.11
| MEMORY CAPACITY | L.B.P | OTHER PRINTERS |
|---|---|---|
| 1 LINE | MH.MR AVAILABLE | ONLY MH |
| 4-MULTIPLE LINES | MH,MR,MMR | MH,MR |
FIG.12
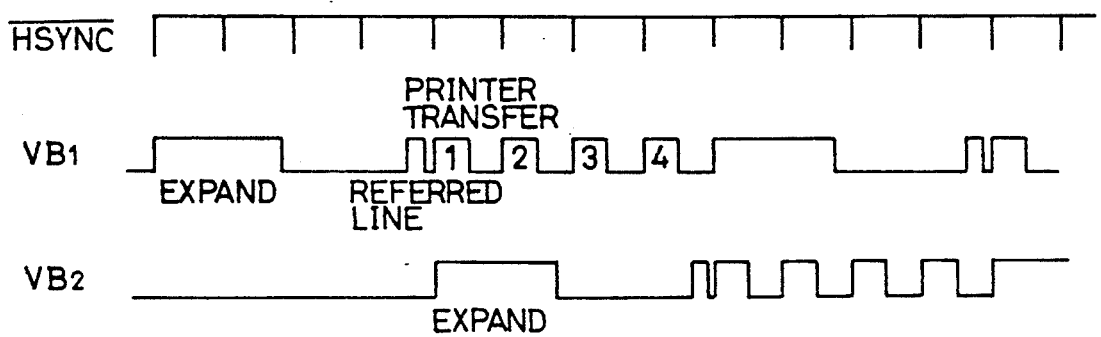

FIG.22 (a)    FIG.22 (b)
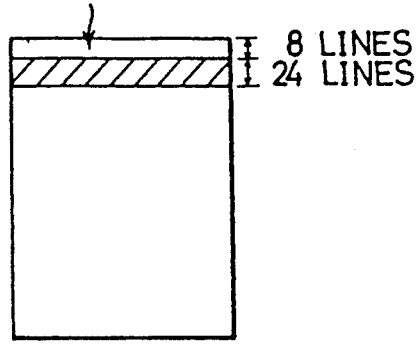
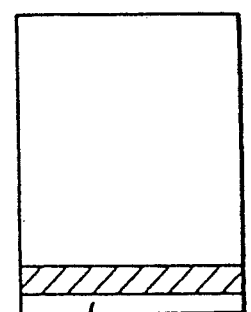
FIG.23
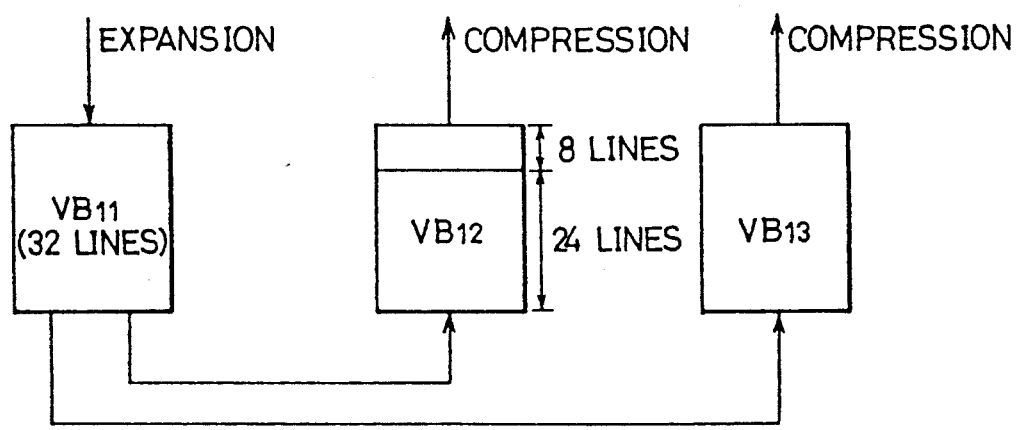

FACSIMILE APPARATUS WITH A PAGE PRINTER HAVING REDUCED MEMORY CAPACITY REQUIREMENTS

BACKGROUND OF THE INVENTION

1. Field of the Invention

The present invention relates to a facsimile apparatus, and more particularly, to a facsimile apparatus having a page printer such as a laser printer that prints in succession one page of image.

2. Description of the Related Art

A conventional facsimile apparatus has been provided that has a page printer such as of the electrophotographic type. Such a facsimile apparatus includes a bit map memory having a capacity for storing dot data of one page. At the time of reception, the reception data from a code memory is expanded, whereby one page of reception data is stored in the bit map memory. This data is transferred to the printer to be printed out.

A conventional facsimile apparatus having a page printer is provided with a bit map memory of the output paper size to print out an image with the printer. In order to store data of one page with a printer of A4 size, for example, a memory capacity of 6M bytes is necessary. This large memory capacity is responsible for the high memory cost, resulting in a problem that the cost of a facsimile apparatus including a conventional page printer is expensive.

SUMMARY OF THE INVENTION

An object of the present invention is to reduce the cost of a facsimile apparatus having a page printer.

Another object of the present invention is to reduce the cost required for the memory in a facsimile apparatus having a page printer.

A further object of the present invention is to reduce the memory capacity required in a facsimile apparatus having a page printer.

A still further object of the present invention is to reduce the cost of a facsimile apparatus.

The above-mentioned objects can be achieved by a facsimile apparatus including the following elements. A facsimile apparatus according to the present invention includes a printer for printing one page of image at a constant speed, a receiver for receiving compressed image data, an expander for expanding the compressed image data to convert the same into print data, a memory having a storage capacity for storing one line of print data, a writer for writing the print data converted by the expander into the memory, a transfer device for reading out the print data from the memory to transfer the same to the printer at a predetermined transfer speed, and a controller for controlling the timing of the writer to write the print data into the memory and the timing of the transfer device to read and transfer the print data in the memory.

A facsimile apparatus having a page printer of the above described elements does not require a conventional page memory of one page. Only at least one line of memory capacity for writing print data is necessary. This allows reduction in cost in a facsimile apparatus having a page printer.

According to another aspect of the present invention, a facsimile apparatus includes a printer for printing an image of one page at a constant speed, a memory formed of a plurality of memories of a predetermined capacity for storing print data to be transferred to the printer, a writing device for writing print data into a plurality of memories at a predetermined order, and a transfer device for reading out print data from a memory that has completed print data writing for transferring the same to the printer at a predetermined transfer speed.

The provision of a plurality of memories for storing print data allows the writing of expanded data in one memory while transferring data to the printer from a memory that has expanded data written. It is therefore not necessary to provide a page memory of one page as in conventional cases. This results in reduction of cost required for the memory in a facsimile apparatus having a page printer.

According to a further aspect of the present invention, a facsimile apparatus includes a printing device for printing an image of one page at a constant speed, an expanding device for expanding compressed image data to convert the same into print data, a memory formed of a plurality of memories for storing the expanded print data, a writing device for writing print data converted by the expanding device into a plurality of memories, a detector for detecting that the print data written by the writing device has come to a predetermined capacity of a plurality of memories, and a transfer device responsive to the detected result of the detector for transferring print data stored in the plurality of memories to the printer at a predetermined transfer speed.

The facsimile apparatus according to the present invention does not require a bit map memory of one page, but only a buffer memory of several lines, whereby print data is expanded from a code memory to be transferred to a printer. The transfer device initiates the transfer of print data to the printer after detection is made by the detector that print data stored in the plurality of memories has reached a predetermined memory region. As a result, the memory capacity required in a facsimile apparatus having a page printer can be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a table for explaining the encoding system in a facsimile apparatus.

FIG. 10 is a block diagram showing the components around a buffer memory of 2 blocks.

FIG. 11 is a table showing the relation of the encoding method according to the memory capacity and the type of printer with a buffer memory of two blocks.

FIGS. 12 and 13 are timing charts for explaining the operation of a buffer memory of two blocks.

FIG. 22a and 22b is a diagram showing the areas of transmission printing and reception printing.

FIGS. 23 and 24 are diagrams for explaining the content of operation in carrying out transmission/reception printing.

DESCRIPTION OF THE PREFERRED EMBODIMENTS

The embodiments of the present invention will be explained hereinafter with reference to the attached drawings.

Figure 1:
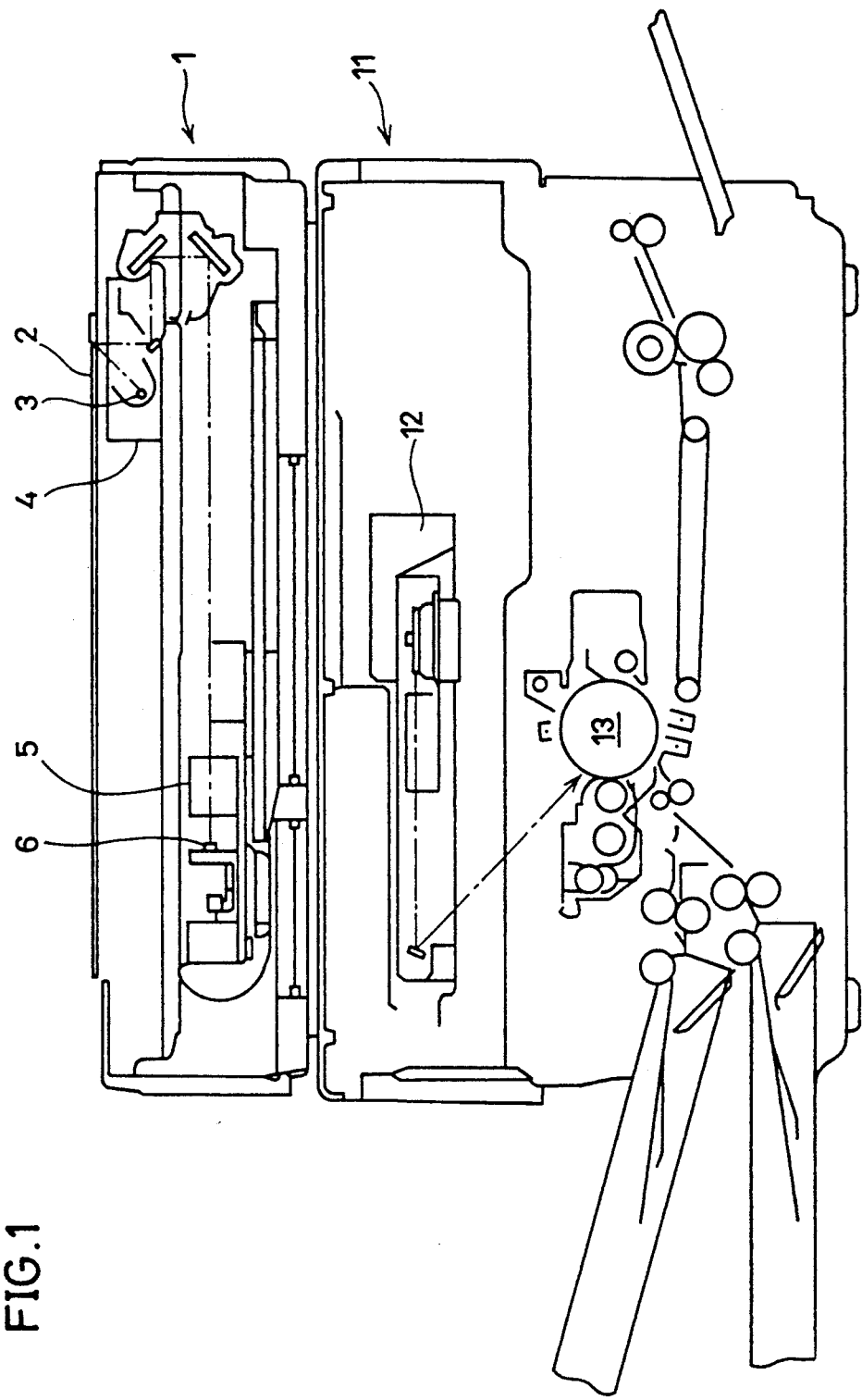
FIG. 1 is a sectional diagram schematically showing the main components of a laser facsimile apparatus.

FIG. 1 is a sectional view schematically showing an original reader 1 for transmission and a printer 11 for reception in a laser facsimile apparatus.

In original reader 1, an original on a platen 2 is illuminated by a light source 3 and scanned by a scanner 4 moved by a stepping motor not shown. The reflected light from the original is reflected by a mirror to enter a linear CCD sensor (for example, 8 pixels/mm) via a lens 5. The output signal of linear CCD sensor 6 is digitalized and then binarized, as described later.

The above-described original reader 1 may used an original travel type original reader that has the original placed upon a movable original mounting platen to carry out scanning by moving the original, instead of scanner 4 that moves to scan the original.

In printer 11, the light emission of the laser diode is controlled by a laser optical system 12 in response to a reception signal, whereby the beam is directed to a photoreceptor 13. Then, the developing, the transfer, and the fixing process are carried out by the well-known electrophotographic process to print the reception signal onto a paper. Because the above mentioned reading and printing operations are similar to those of a conventional laser printer, their description will not be repeated.

Figure 2:
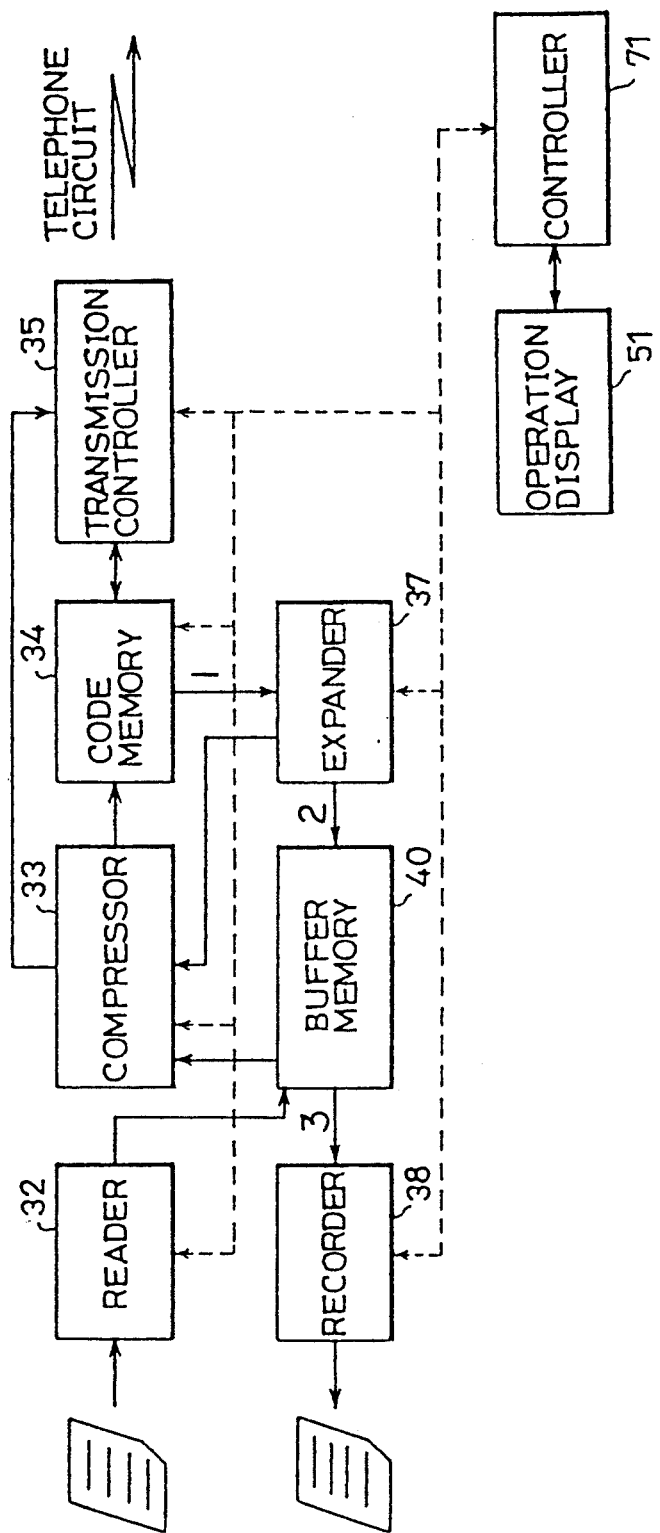
FIG. 2 is a block diagram showing the components of the structure of a facsimile apparatus.

The operation of a facsimile will be explained hereinafter schematically with reference to FIG. 2. The operation of the caller side will be first explained. The original is converted into electrical signals by reader 32 including linear CCD sensor 6 of original reader 1. A predetermined binarizing process (dither process, for example) is carried out to convert the signals into binarized signals of time sequence. The converted data is stored temporarily in buffer memory 40. The data read out from buffer memory 40 is encoded by a compressor 33 in accordance with a system such as the MH system or the MR system. The encoded signal is stored in code memory 34. Connection with the destination side is carried out by a transmission controller 35, whereby the signal in code memory 34 is sent to the telephone circuit by a predetermined procedure.

The operation of the destination side will be explained. On transmission controller 34 receiving a connecting request from the caller side, the telephone circuit is connected to receive a signal. This signal is stored in code memory 34. An expander 37 decodes the signal in code memory 34 to convert the same into a signal that can be provided from recorder 38. Buffer memory 40 temporarily stores this signal.

A controller (referred to as CPU hereinafter) 71 carries out the above described signal process and the display of operation display 51, according to the signals from reader 32, transmission controller 35, etc. and the input signal from operation display 51.

The method of compressing a signal will be explained hereinafter. The facsimile apparatus compresses the electric signal using a likely-appearing pattern (continuous white signals, continuous black signals). This is because if the binarized electric signal obtained by reading an original with linear CCD sensor 6 is directly stored, a large memory capacity will be necessary, in addition to the disadvantage that this process is time consuming. There are three types of methods of compressing an electric signal, which is the MH method, the MR method, and the MMR method, as shown in FIG. 3.

The one-dimensional encoding is a method of encoding the continuous length (run length) of the same color of pixels of the white pixel and the black pixel appearing alternately on one line. The two-dimensional encoding is a method of encoding based on the position relation between the position of each changed pixel on the currently encoding scan line (encoded line) and the corresponding changed pixel on the referring line immediately before the encoded line. A changed pixel is referred to as the first pixel changing from white to black, or from black to white.

Figure 4:
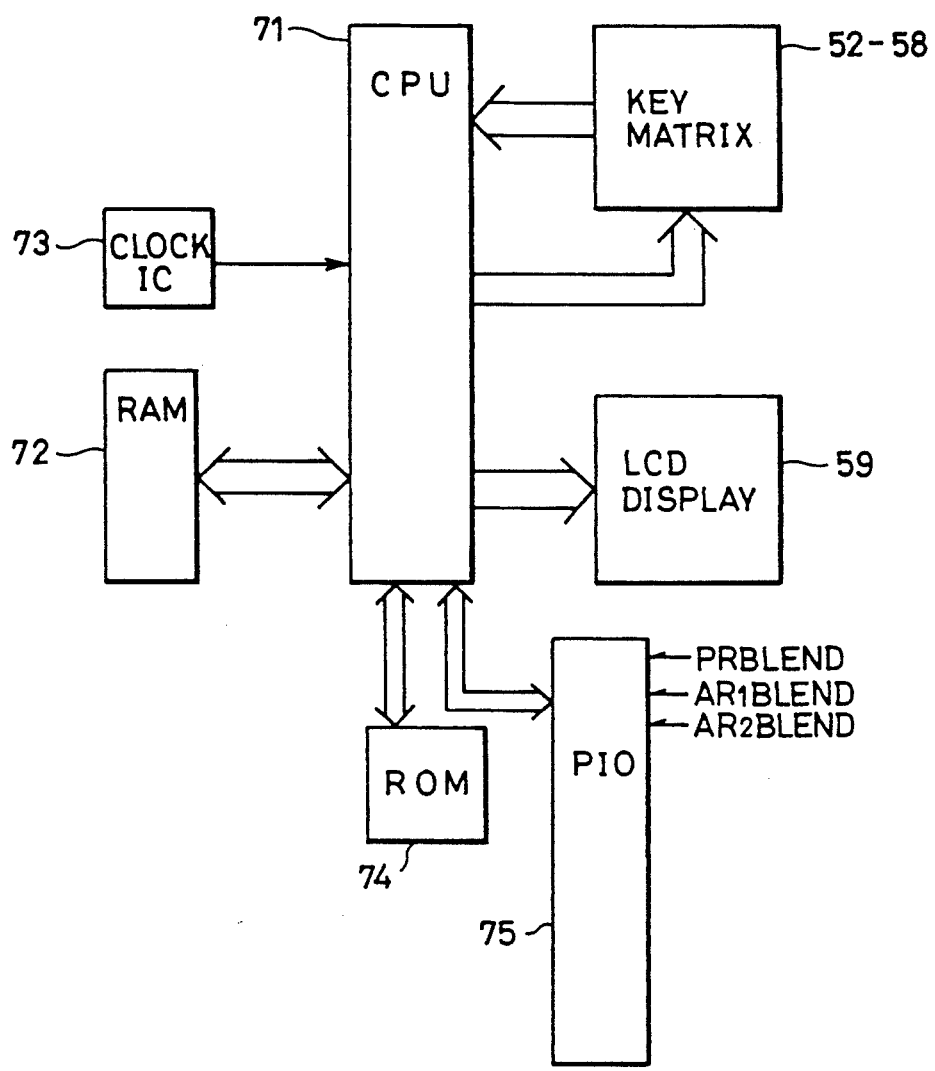
FIG. 4 is a block diagram of a CPU controlling a facsimile apparatus.

FIG. 4 is a block diagram showing the periphery of CPU 71 controlling the facsimile apparatus. A RAM 72 for working usage, a clock IC 73 for timing, a ROM 74, and a PIO 75 are connected to CPU 71. Also, key matrixes 52-58 of operation display 61, and a LCD display 59 are connected to CPU 71, in addition to each controller (refer to FIG. 2).

Figure 5:
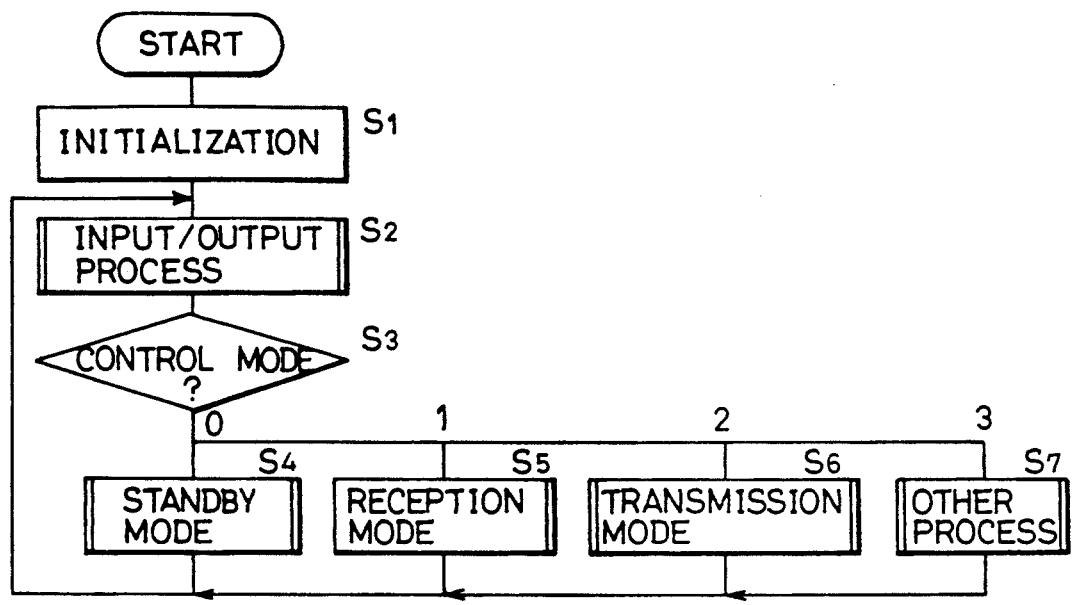
FIG. 5 is a flow chart showing the main flow of a CPU.

FIG. 5 is a flow chart showing the main flow of CPU 71 controlling the facsimile apparatus. Initialization is carried out at step S1 after the reset of CPU 71. At step S2, the input/output process of CPU 71 is carried out. At step S3, the control mode that changes according to the input signal from PIO 75 is checked, whereby the program diverges. If the control mode value is 0, the program proceeds to step S4, if 1 to step S5, if 2 to step S6, and if 3 to step S7. At the standby mode of step S4, CPU 71 waits for a signal to arrive by operation of a key or by reception. The program performs the reception mode process of step S5 if the apparatus is carrying out the reception process, and the process of transmission mode of step S6 if the apparatus is carrying out the transmission process. If a process other than the reception mode or the transmission mode, for example if a shortened dialing key is registered, the subroutine of the other process of step S7 is executed. On termination of each process, the program returns to step S2.

Figure 6:
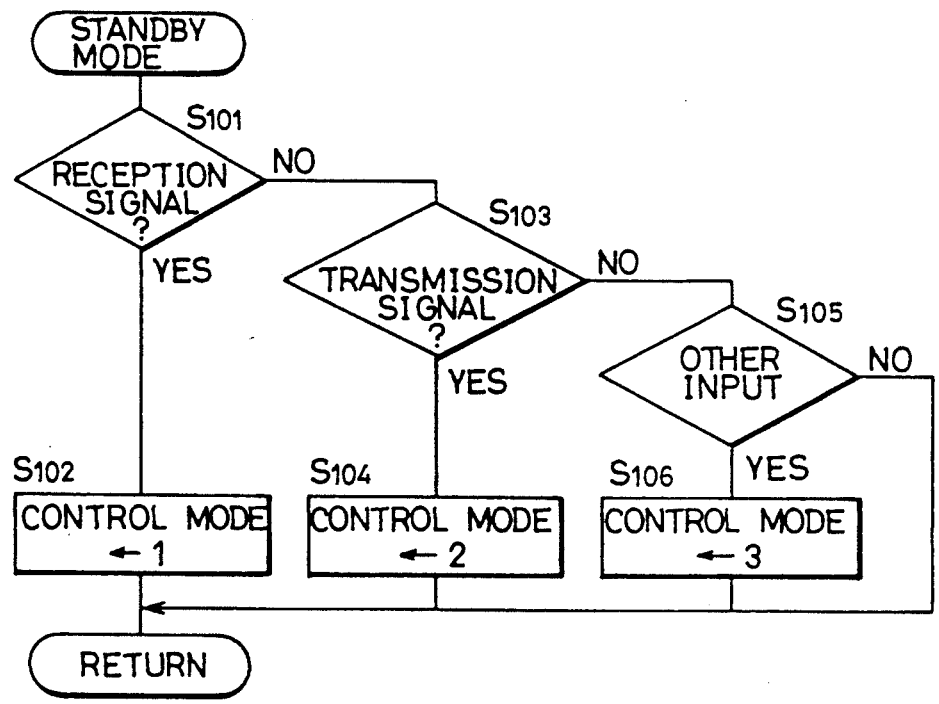
FIG. 6 is a flow chart showing a standby mode process.

FIG. 6 is a flow chart showing the contents of the standby mode process (step S4). At step S101, the entry of an arrived signal is checked. If an arrived signal is received, the program proceeds to step S102, where the control mode is set to 1, and then returns. If an arrived signal is not entered, the program proceeds to step S103, where the presence of a transmission signal input is checked. If there is a transmission signal, the program proceeds to step S103 to set the control mode to 2, and then returns. When determination is made at step S103 that a transmission signal is not entered, the program checks if there is other input at step S105. If YES, the program proceeds to step S106 to set the control mode to 3, and then returns. If determination is made at step 105 that there is no other input, the program directly returns.

The operation of compressor 33, expander 37, and buffer memory 40 of FIG. 2 will be explained hereinafter. A conventional facsimile apparatus comprises a bit map memory of one output page of the printer (referred to as page memory hereinafter), which corresponds to buffer memory 40 of FIG. 2. Data of one page in code memory 34 expanded by expander 37 (indicated by in FIG. 2) to is expanded by expander 37 (indicated by ① in FIG. 2) to be stored in the page memory as a bit map memory of one page (indicated by ② in FIG. 2). This data is then transferred to recorder (PR) 38 at a predetermined transfer speed (indicated by ③ in FIG. 2). The operation of ③ is carried out after the termination of the operations indicated by ① and ② in FIG. 2.

The reason why such operation is carried will be explained hereinafter. If a page printer is used as recorder 38, data of one page is recorded at the system speed of the printer upon the start of the page printer. This means that the operation indicated by ③ must be carried out at a constant speed since it is necessary to transfer data according to the speed of the printer. It is to be noted that the operation indicated by ① and ② has the speed thereof modified depending on the encoded data of code memory 34. With the typical encoding methods of MH, MR and MMR shown in FIG. 3, the compression efficiency is high since short codes are allocated when white or black data are in succession. However, the compression efficiency is low in the case where white and black data appear alternately, (for example, halftone data). When viewed by one line, the encoded data is short of a line with white or black in succession, so that the time required for expanding is not so long. On the contrary, the encoded data is long of a line with white and black likely to appear alternately, so that the time required for expanding is long. Therefore, the operation time period of ① and ② depends on the length of the encoded data when viewed in line unit.

An embodiment employing a buffer memory according to the present invention will be explained in detail. The detailed embodiment of the present invention will be explained for the time of reception and for the time of transmission of the facsimile apparatus. Regarding the reception of the facsimile apparatus, buffer memory 40 having various numbers of blocks will be explained. The transmission of the facsimile apparatus will be explained for immediate transmission and for memory transmission.

(A) Reception operation (1) When buffer memory 40 is 1 block (1 line)

Figure 7:
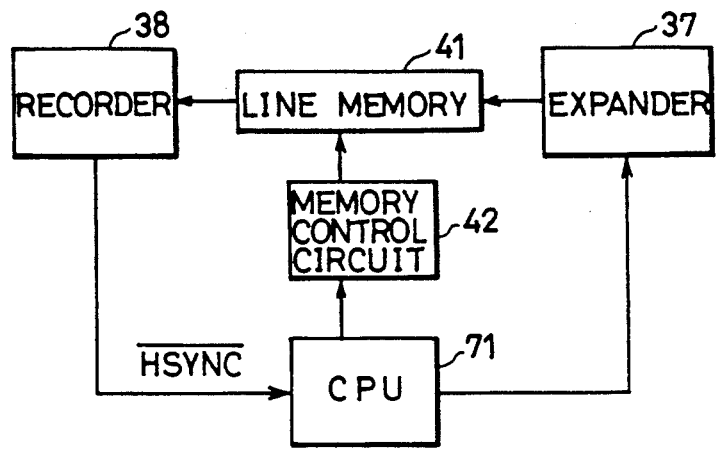
FIG. 7 is a block diagram showing the components around a line memory where the buffer memory is one line.
Figure 8:
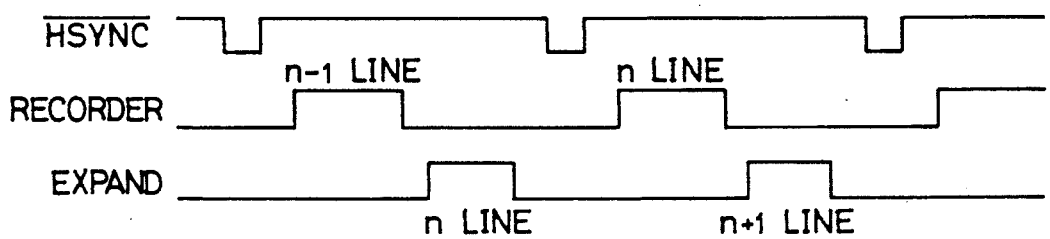
FIG. 8 is a timing chart for explaining the operation of a buffer memory of one line.

The block diagram and the timing chart of a buffer memory of one line are shown in FIGS. 7 and 8, respectively. FIG. 7 is a diagram showing the main components in the periphery of line memory 41 corresponding to buffer memory 40 of FIG. 2. Expander 37 expands data of one line from code memory 34 to store the same into line memory 41. Then, recorder 38 is started, whereby data is transferred to recorder 38 from line memory 41 in accordance with a synchronizing signal $\overline{\text{HSYNC}}$ of recorder 38. Upon termination of a transfer of one line of data, the next line is expanded before the arrival of synchronizing signal $\overline{\text{HSYNC}}$ of the next line.

The reason why the printer can be controlled just by a buffer memory of one line will be explained hereinafter.

Figure 9:
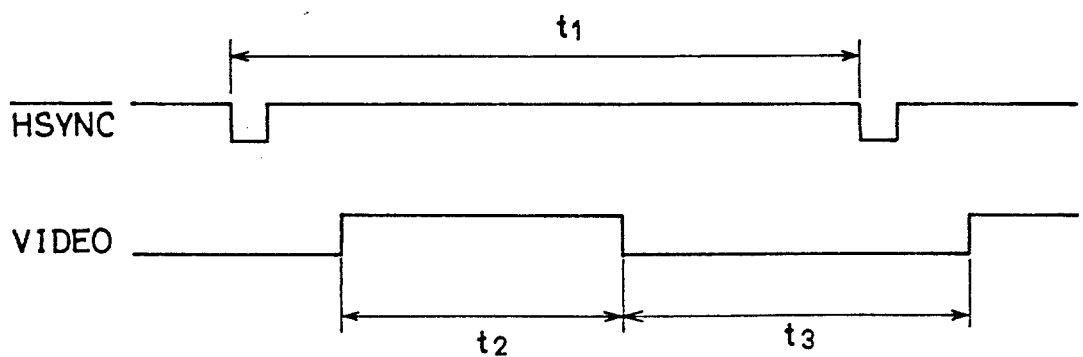
FIG. 9 is a timing chart indicating the scanning efficiency of a laser beam printer.

A timing chart for explaining the scanning efficiency of the laser beam printer is shown in FIG. 9. Referring to FIG. 9, signal $\overline{\text{HSYNC}}$ is a signal indicating the start of scanning, and is represented by the time period till the start of scanning of the next line. The time period required for the data to be transferred to recorder 38 is represented by t2. Because a polygon mirror is employed in the laser beam printer, the scanning efficiency (t2/t1) is approximately 60%. By setting the system speed of the printer and by expanding data of one line during the interval of data transfer to recorder 38 so that data of one line is always expanded during the time period represented by t3 irrespective of the expanding time of image data of one line changing, the print operation can be carried out by a buffer memory of only 1 line.

VIDEO represents the data transferred to the printer.

When the printer employed as recorder 38 is the laser beam type, the printer can be controlled just by a buffer memory of only 1 line. The above described method is not available for other page printers, for example, a liquid crystal printer and an LED printer, because the scanning efficiency is generally 100%. However, by extending the interval of the drive timing for each line of a printer head to set the scanning efficiency to approximately 60%, print operation is possible just by a buffer memory of only one line, similarly to the example of the above-described laser printer.

(2) When buffer memory 40 is 2 blocks

Figure 13:
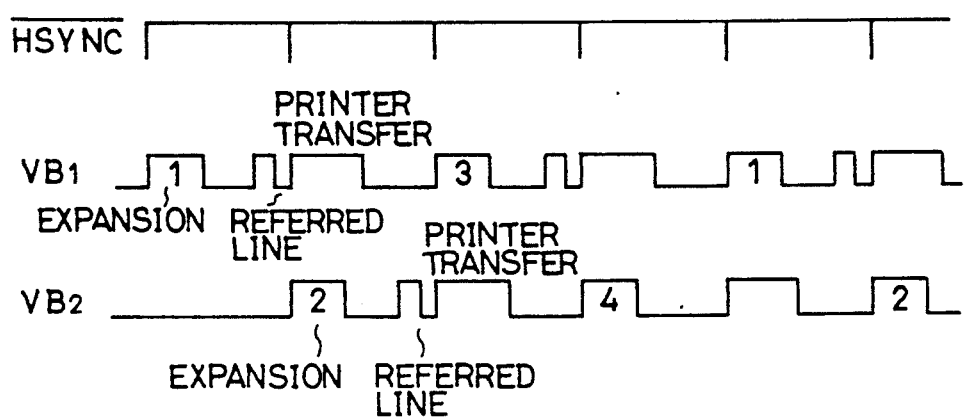

A block diagram of this buffer memory is shown in FIG. 10. FIG. 11 shows the available encoding method according to the memory capacity and the type of printer. FIGS. 12 and 13 show the timing chart in a certain encoding method.

Referring to FIG. 10, buffer memory 40 comprises two buffer memories VB1 and VB2. Each of buffer memories VB1 and VB2 is connected to expander 37 via gates G11 and G21, respectively, and is also connected to recorder 38 through a bus via gates G12 and G22, respectively. Gates G11, G12, G21, and G22 are provided in order to prevent each data from colliding against each other.

Buffer memories VB1 and VB2 have different available encoding methods according to memory capacities and the type of the printer, as shown in FIG. 11. LBP is the laser beam printer described in the prior embodiment of one block. Other printers are liquid crystal printers and LED printers.

If the memory capacity is one line and the encoding method is the MH method in a laser beam printer and in other printers, buffer memories VB1 and VB2 can be used alternately for expanding and for transferring to the printer. Also in the case where the memory capacity is lines of a multiple of 4 and the encoding method is the MR method, similar process is carried out since it is not necessary to fetch the referred line from another buffer memory.

FIG. 12 indicates the case where the MMR encoding method is employed in a laser beam printer having a memory capacity of a 4-multiple lines. First, data of four lines are expanded to buffer memory VB1. On termination of the expansion, a referred line is fetched into expander 37 to carry out expansion of the subsequent line into buffer memory VB2. The expanded data from buffer memory VB1 is transferred to recorder 38 in synchronism with synchronizing signal $\overline{\text{HSYNC}}$ of recorder 38. During this time period, the next data are expanded to buffer memory VB2.

The case where the MR encoding method is employed in a laser beam printer having a memory capacity of one line will be explained with reference to the timing chart of FIG. 13. The operation is basically similar to that of FIG. 12. However, it should be noted that a referred line is not included between the expansion indicated by 4 in buffer memory VB2 and that indicated by 1 of buffer VB1 because data is expanded by the MH method once for every 4 lines in the case of the MR method.

The remaining operation are similar to those shown in the case of FIG. 12.

Because the problem described in (1) does not occur if the buffer memory has 2 blocks or more, a page memory of one page is not necessary even if the printer is the liquid crystal type or the LED type.

(3) When buffer memory 40 is 3 blocks or more

It is shown in FIG. 11 that the MMR method cannot be employed in other printers if the buffer memory is 2 blocks. However, if the buffer memory is 3 blocks, data can be written into the subsequent buffer memory while referring to the last data of the prior one buffer memory. Data is transferred from the remaining buffer memory to recorder 38 during this time period.

When the memory block comprises 3 blocks, expansion and transfer to recorder 38 are carried out smoothly since the problem of the referred line does not occur regardless of whether each block is one line or a 4-multiple lines, or whether the encoding method is MR or MMR.

Figure 14:
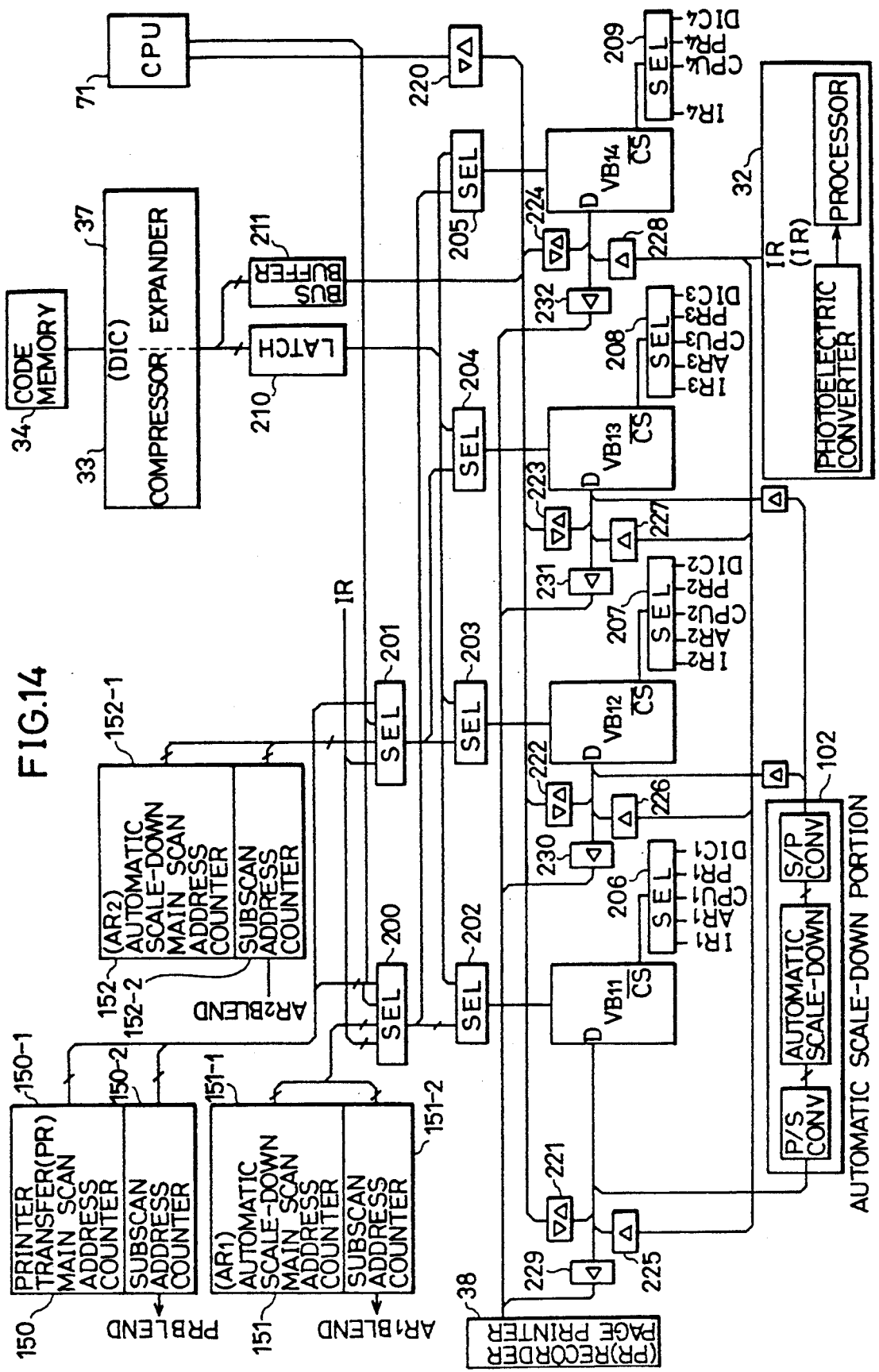
FIG. 14 is a block diagram showing the structure of the components where the buffer memory has 4 blocks.
Figure 15:
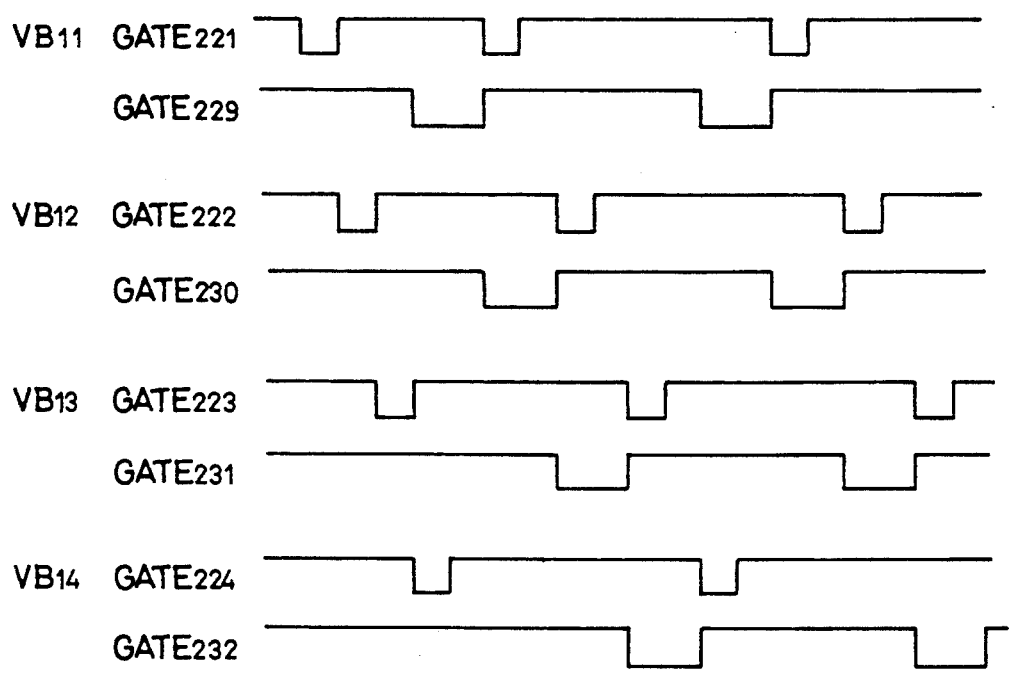
FIG. 15 is a timing chart of the gate for explaining the operation of a buffer memory of 4 blocks.
Figure 16A:
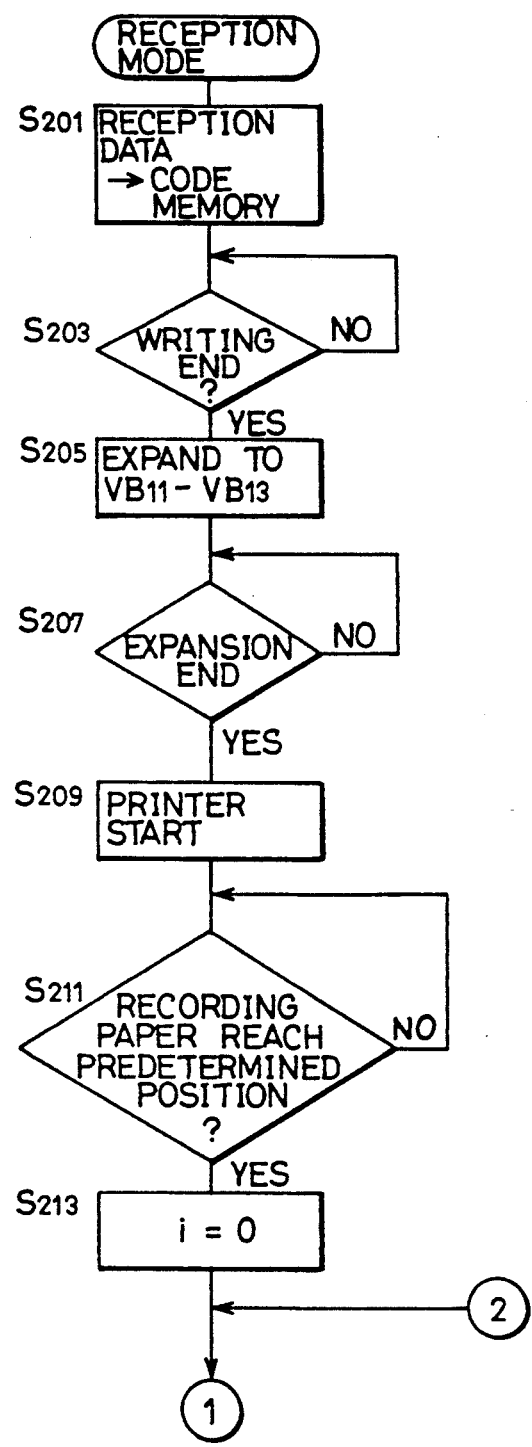
FIGS. 16A and 16B are flow charts showing the contents of reception mode.
Figure 16B:
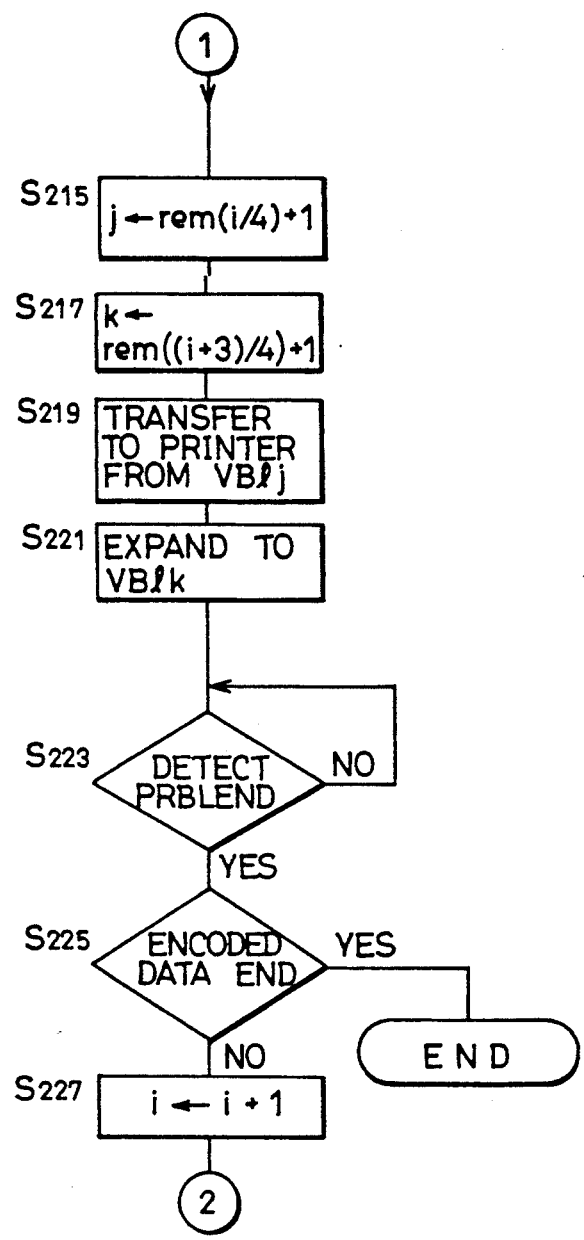

As an example of a buffer memory comprising 3 blocks or more, an embodiment where the buffer memory has 4 blocks will be explained with reference to FIGS. 14, 15, 16A and 16B. FIG. 14 is a block diagram showing the main components in the periphery of the buffer memories. FIG. 15 is a timing chart showing the open and close of the gates around each buffer memory. FIGS. 16A and 16B are flow charts of the reception mode.

Referring to FIGS. 14, 16A and 16B, reception data is written into code memory 34 upon the start of the reception mode (S201, S203). The encoded data stored in code memory 34 is expanded by expander 37 and written into buffer memory VB11 (not necessarily into buffer memory VB11, and may be any of VB12-14). Upon the termination of writing to buffer memory VB11, expander 37 commences to write to the next buffer memory VB12. Similarly, upon termination of the writing to buffer memory VB12, writing to buffer memory VB13 is carried out (S205). The termination of writing to buffer memory VB13 is determined by CPU 71, to send a record start signal to recorder 38 (S207, S209). In response to this signal, recorder 38 provides a recording paper, and then sends a print start signal to CPU 71 when the recording paper reaches the predetermined position for the start of printing (S211). On receiving this signal, CPU 71 begins to transfer data from buffer memory VB11 to the recorder. In addition, expander 37 expands the remaining data transmitted to VB13, and data is written into buffer memory VB14 (S213-S221). "rem( )" in S215 and S217 is a function for obtaining the remainder of the calculated result within ( ). At this time, only gate 224 is enabled, and gates 221-223 are disabled, of gates 221-224 provided in each of buffer memories VB11-VB14. Since data transfer from buffer memory VB11 to recorder 38 is commenced after the termination of data writing to buffer memory VB13 in the present embodiment, succession of data having low scanning efficiency and slower expansion speed of data than the printing speed can be coped with sufficiently. The timing to start the printer may be set arbitrarily. The printer may be started at the time when data is written up to a predetermined area in buffer memory VB14, or when data writing to buffer memory VB14 has been completed.

Gates 229-232 of the recorder 38 side are operated as follows. When data is read out from buffer memory VB11, only gate 229 is enabled, and gates 230-232 are disabled. Gate 220 is disabled at this time since it is only enabled when CPU 71 accesses the buffer memory. Selectors 200 and 201 select an address to transfer to recorder 38. When data transfer from buffer memory VB11 to recorder 38 and writing of expanded data into buffer memory VB14 are carried out, selector 202 selects an address from which the data in buffer memory VB11 is to be transferred, and selector 205 selects an address in buffer memory VB14 to which data is to be written from expander 37.

The buffer memories VB11-VB14 are similarly controlled by selectors 206-209. At this time, gates 225-228 are disabled. Latch 210 and bus buffer 211 are required because the data bus and the address bus are shared for time division in the expander and the compressor.

The timing of each gates of 221-224, 229-232 are shown in FIG. 15. Gates 221-224 are controlled in synchronism with the data write process to buffer memories VB11-VB14, respectively. Gates 229-232 are controlled at a constant cycle for the transfer process of data from buffer memories VB11-VB14 to recorder 38. In the timing chart of FIG. 15, the gate is "open" when the signal is "L" and "closed" when the signal is "H".

When the expanding speed is faster than the transfer speed of the printer, the process of expanding and writing data into buffer memory VB14 terminates earlier than the termination of transfer of buffer memory VB11. Upon termination of data transfer from buffer memory VB11 to recorder 38, i.e., when the subscan address counter of transfer to recorder 38 reaches a predetermined address, a PRBLEND signal is provided indicating the termination of printer block transfer (S223). When PRBLEND signal is detected, determination is made whether there are still encoded data in code memory 34. When there is no encoded data left in code memory 34, the data expanded to buffer memories VB11-VB14 are transferred to recorder 38 in synchronism with the printing speed to end this routine. When there is an encoded data left, the next buffer memory carrying out transfer and expansion is specified to repeat the above described operation. In other words, upon termination of transfer from buffer memory VB11 to recorder 38, data transfer from buffer memory VB12 to recorder 38 is commenced. Upon termination of expansion of the encoded data to buffer memory VB14, the expansion to buffer memory VB11 is commenced. Furthermore, upon termination of data transfer from buffer memory VB12 to the printer, data is transferred from buffer memory VB13 to recorder 38, and then data is expanded into buffer memory VB12. This process is repeated in similar sequence. In S215–S221 in the flow chart of the FIG. 16A, the buffer memory from which data is be transferred to the printer, and the buffer memory to which the encoded data is expanded are specified.

Figure 17:
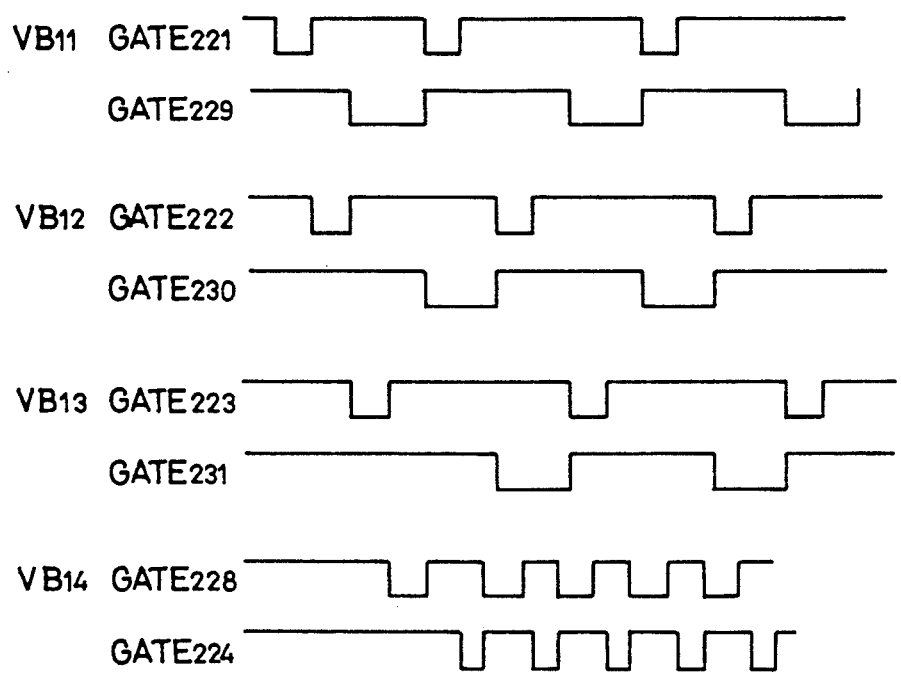
FIG. 17 is a timing chart of the gate for explaining the operation of a buffer memory of 4 blocks.

The operation of simultaneously carrying out the reading of an original with reader 32 and the printing of the received image with recorder 38, by dedicating buffer memories VB11–VB13 for transfer to recorder 38 and buffer memory VB14 for reading, will be explained with reference to the timing chart of FIG. 17. Buffer memories VB11–VB13 carry out the process similar to those described previously in the case of a buffer memory of 4 blocks. When reading is carried out at this time, all data stored in buffer memory VB14 is read out, followed by compression of data from buffer memory VB14 during the time period when expansion is not carried out. Upon termination of compression, the next several lines are read out. With the facsimile apparatus of the present embodiment having one exclusive read buffer memory of the 4 buffer memories, reading and printing are carried out simultaneously, where all the 4 buffer memories can be used to transfer data to recorder 38 when carrying out printing only. Therefore, the limitations with respect to change in the data expansion speed and the compression method becomes minimum to utilize the buffer memory effectively.

The allocation of buffer memories VB11–VB12, VB13 and VB14 are switched by a control signal from CPU 71.

When the reading of an original and the printing are carried out simultaneously, the reading of the original must be carried out according to the compression speed of data from buffer memory VB14 by compressor 33, since only one buffer memory is used. In this case, the travel speed of scanner 4 and the reading operation by CCD sensor 6 are controlled according to the above-mentioned compression speed.

(b) Transmission operation

The operation of the facsimile apparatus at the time of transmission will be explained, classified into immediate transmission and memory transmission.

(1) Immediate transmission

Figure 20:
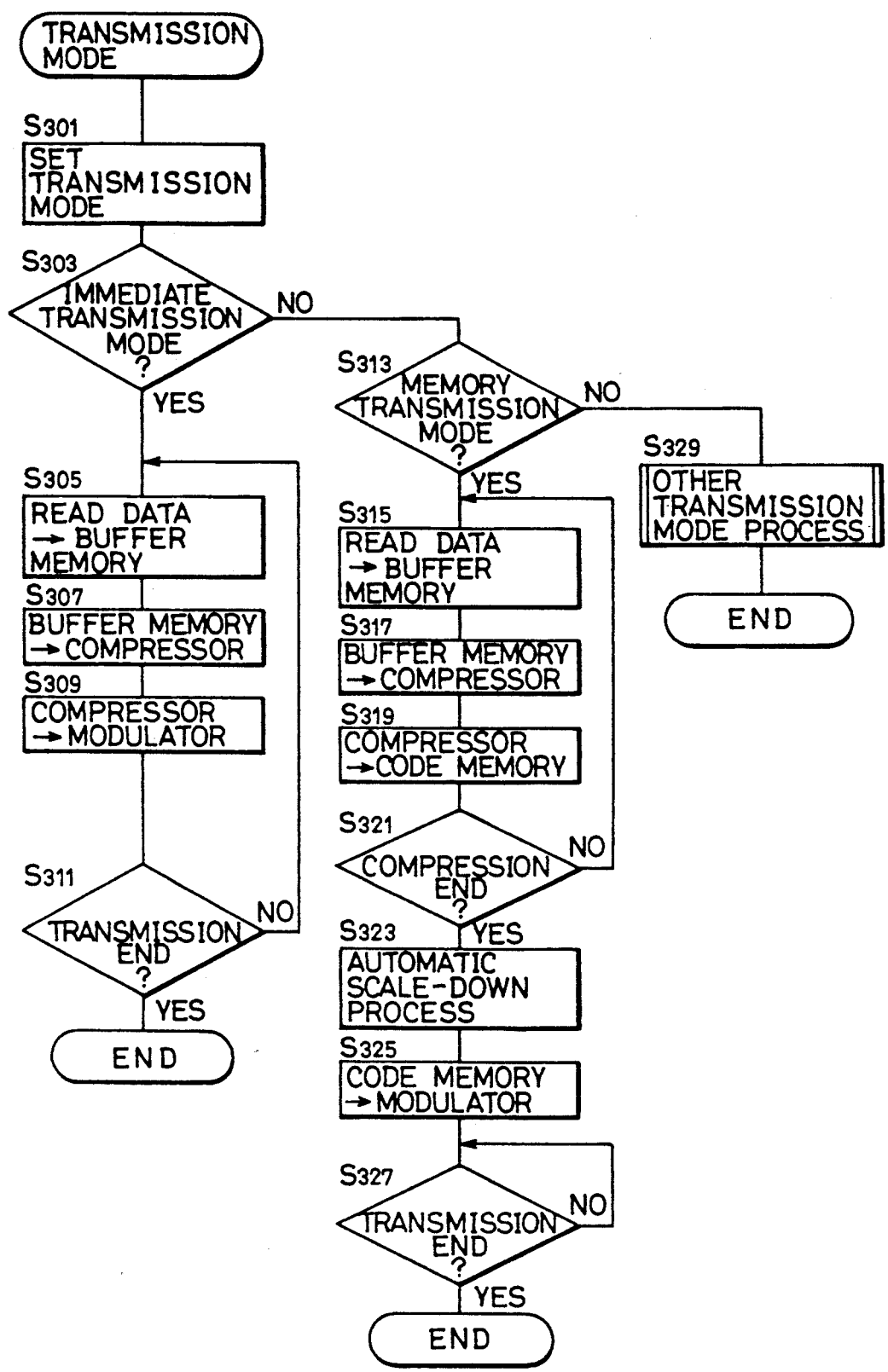
FIG. 20 is a flow chart indicating the contents of transmission mode.
Figure 21A:
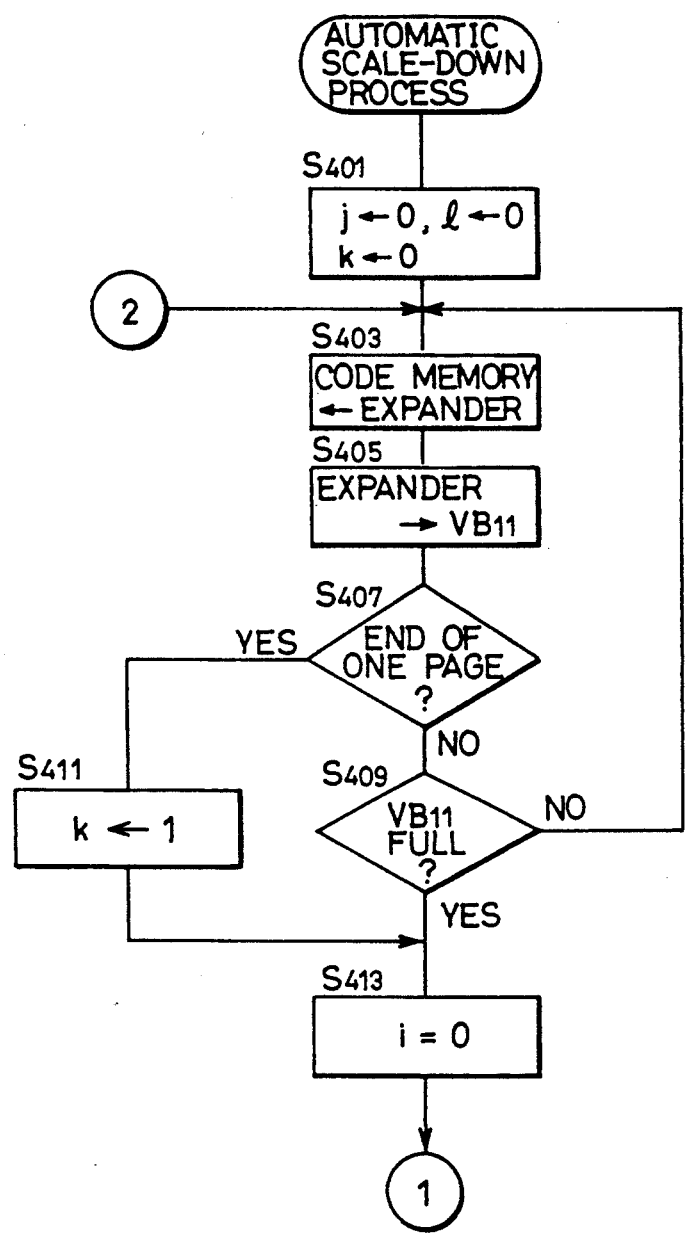
FIGS. 21A–21C are flow charts showing the contents of automatic scale-down process.
Figure 21B:
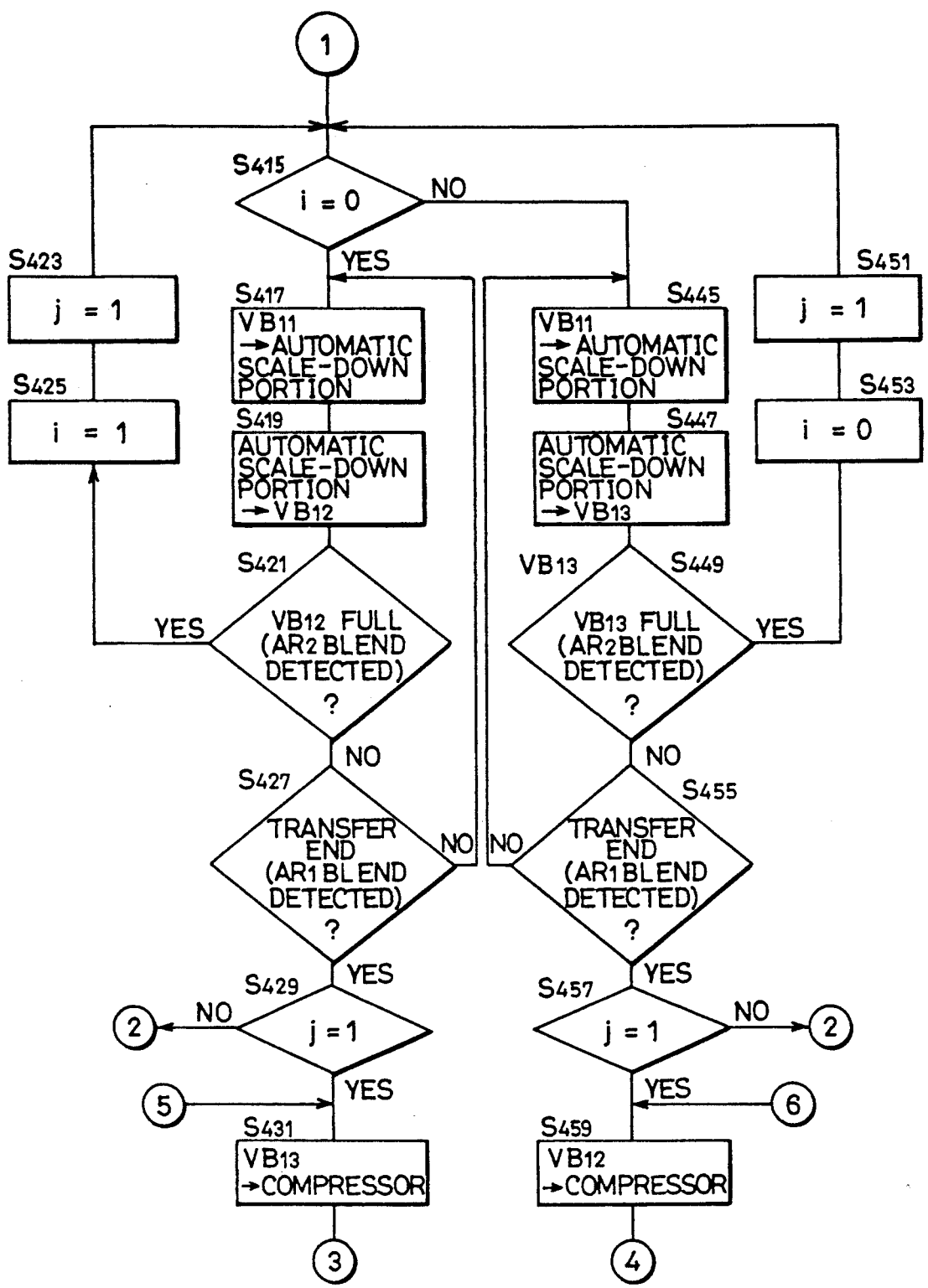
Figure 21C:
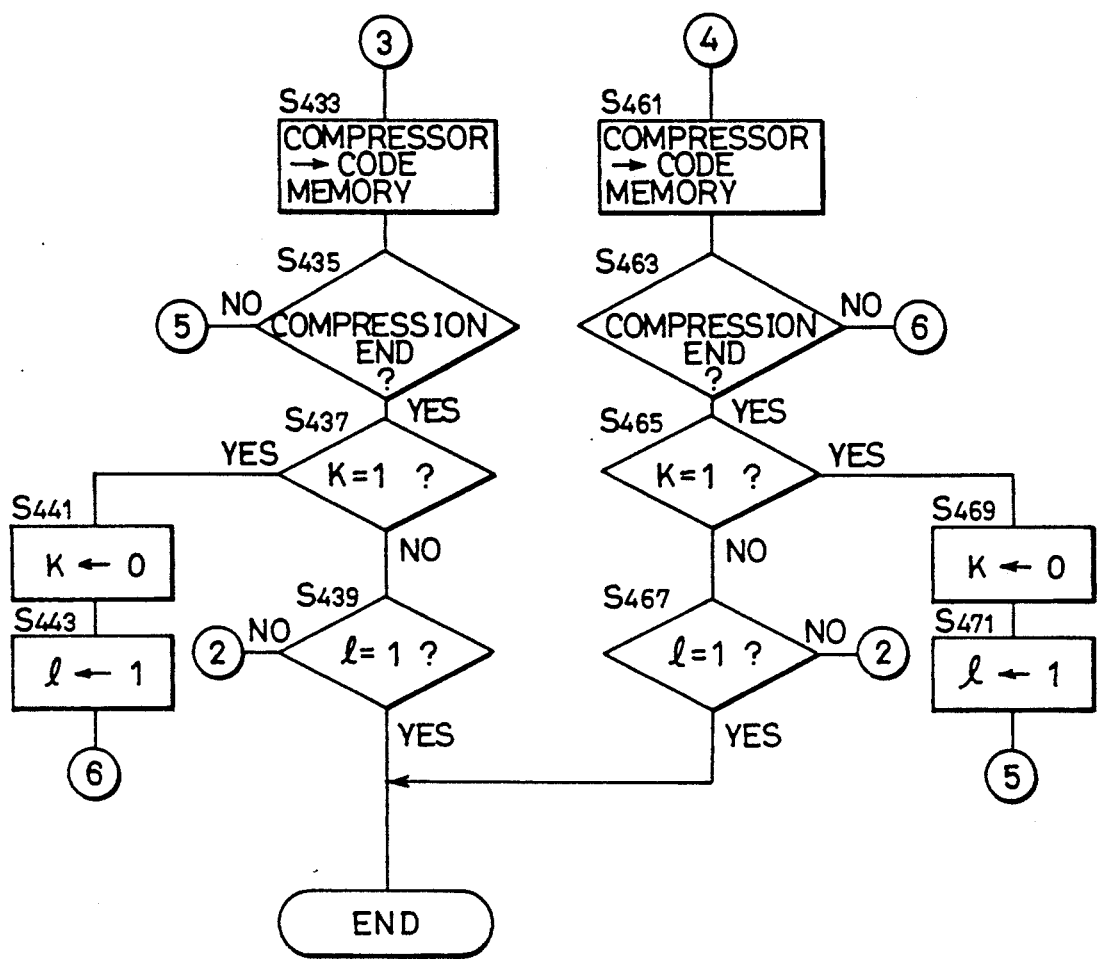

Referring to FIGS. 14 and 20, the operation of immediate transmission where the buffer memory is 4 blocks will be explained hereinafter.

Figure 18:
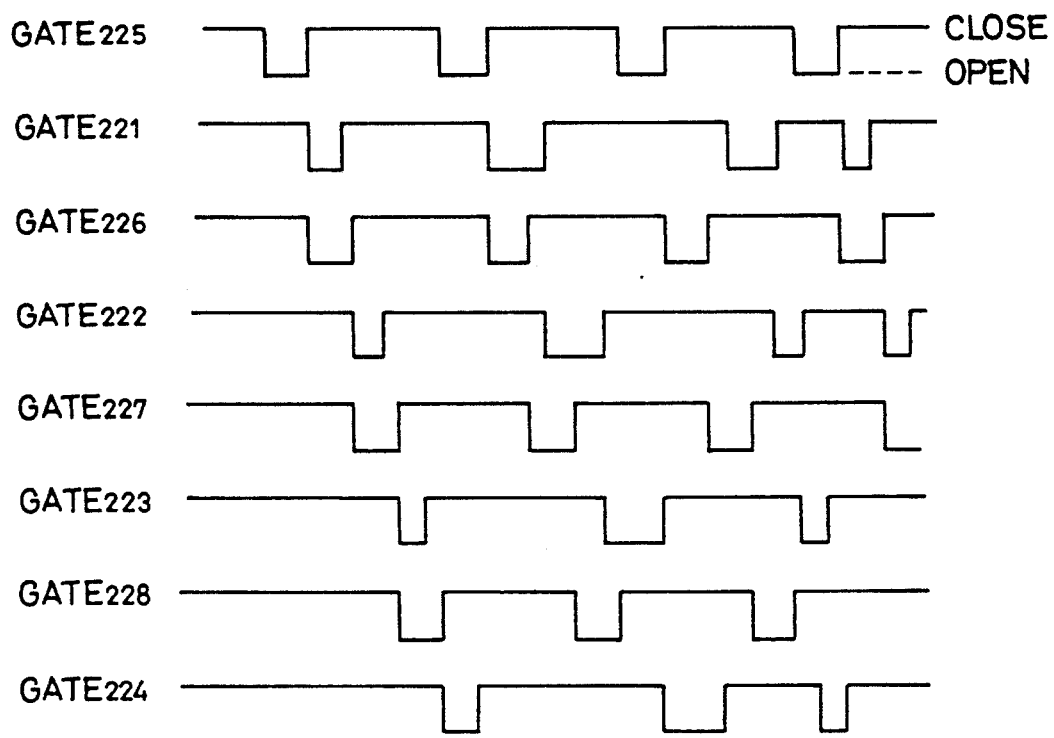
FIG. 18 is a timing chart showing an example of the operation of each gate at the time of original reading.

Reader 32 reads an original by moving scanner 4 at a constant speed, whereby the data is first written into buffer memory VB11 (S301–S305). Next, data is written into buffer memories VB12 and VB13. Upon termination of data writing to buffer memory VB11, the data written into buffer memory VB11 are read out to be compressed by compressor 33 and then written into code memory 34 (S307). The compression of data of buffer memory VB11 is carried out in parallel with the data from reader 32 being written into buffer memory VB12. FIG. 18 is a timing chart showing an example of the operation of each gate at the time of reading an original. Gates 225–228 are controlled at the constant cycle in synchronism with writing data to buffer memories VB11–VB14. Gates 221–224 are controlled in synchronism with the transfer of data from buffer memories VB11–VB14 to compressor 33. Because the image read speed of reader 32 is slower than the data compression speed, the process of data compression in buffer memory VB11 terminates earlier than the process of data writing to buffer memory VB12, so that data compression in buffer memory VB12 is carried out in parallel with the data writing process to buffer memory VB13 after the termination of data writing to buffer memory VB12. The data compression process may take some time period according to the type of data. For example, the process of data writing to buffer memory VB12 may first terminate than the data compression process in buffer memory VB11 (refer to FIG. 17).

Even in such a case, data from reader 32 will be continued to be written into buffer memory VB13, without waiting for the termination of data compression process of buffer memory VB11.

Thus according to the present embodiment described above, the 4 buffer memories are used for reading the image when the reading of the image data and the printing by recorder 38 are not carried out in parallel. This will reduce the effect of changed in compression speed in comparison with the case where only one buffer memory is used to improve the read out speed of reader 32. Furthermore, reader 32 can carry out reading of an image at a constant speed even though a memory of a capacity of one page is not provided.

In the case of carrying out automatic scale-down according to the paper size of the destination side, the image data read by reader 32 is written alternately to buffer memories VB12 and VB13 via an automatic scale-down portion 102.

Date written into code memory 34 are sequentially read out and modulated to be provided from the telephone circuit. The automatic scale-down operation will be explained later.

2) Memory transmission

At the time of memory transmission, the data read by reader 32 is stored in the code memory, as in the case of the above described immediate transmission. The data temporarily stored in code memory 34 is read out to be expanded by expander 37. This data is re-compressed according to the compression method of the destination side and then transmitted. If the paper size of the destination side (the reception side) is smaller than that of the original, it is necessary to simultaneously carry out automatic scale-down according to the paper size of the destination side, as will be explained hereinafter.

(i) Automatic scale-down

Data is read out from code memory 34 to be expanded by expander 37 and then written into buffer memory VB11. Upon termination of the writing, data is read out from buffer memory VB11 to be scaled-down by skipping data in both the main scan and the subscan direction according to a well-known method by automatic scale-down portion 102. This scaled down data is written into buffer memory VB12. Because automatic scale-down is carried out, buffer memory VB12 will not become full even if all the data in buffer memory VB11 is written. The remaining data is read out from code memory 34 to be expanded and written into buffer memory VB11. Then, in a similar manner, data is read out from buffer memory VB11 to be subjected to automatic scale-down and written into the remaining area of buffer memory VB12. When buffer memory VB12 becomes full, an AR2BLEND signal is provided to switch to buffer memory VB13. The following data is written into buffer memory VB13. When this transfer is completed, the writing has ended in the middle of buffer memory VB13. The CPU 71 is notified that the data in buffer memory VB12 is full by detecting the AR2-BLEND signal. After the termination of this transfer (AR1BLEND signal detection), data is read out from buffer memory VB12 to be compressed by compressor 33 and written into code memory 34. In other words, automatic scale-down and transfer are carried out until one of buffer memories VB12 and VB13 becomes full. Then, the operation of compression is repeated. CPU 71 detects that buffer memory VB12 is full at an AR2-BLEND signal of an odd number order, and that buffer memory VB13 is full at an ARBLEND signal of an even number order.

Figure 19:
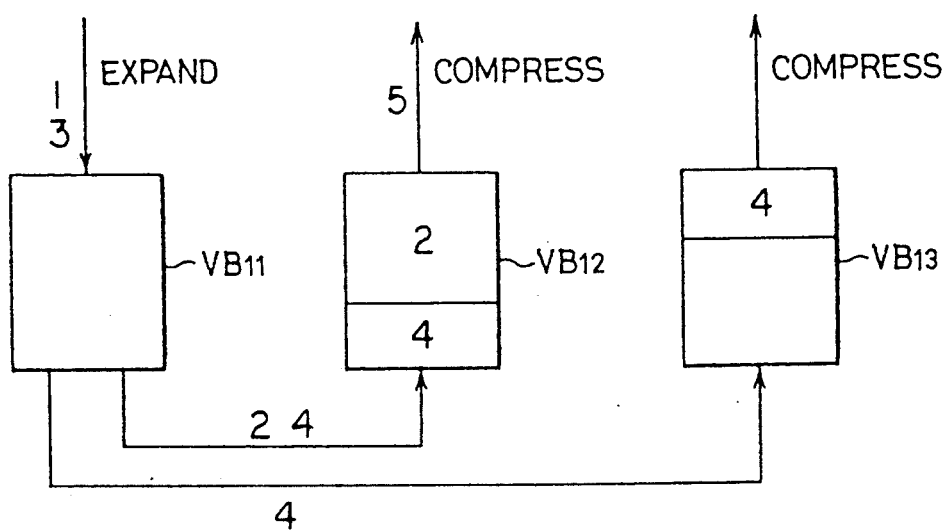
FIG. 19 is a diagram for explaining the sequence of operation in a buffer memory of 3 blocks.

The above described process will be explained hereinafter with reference to FIG. 19. FIG. 19 shows three buffer memories VB11-VB13 and the sequence of the data process stored in each of buffer memories VB11-VB13. Referring to FIGS. 19, 21a-21c, ② indicates the first data transfer, and ④ the second data transfer. At the time of the second data transfer, data is written into an address succeeding that from the first data transfer in the present embodiment. However, the address should not be continuous when the page is at its end or when writing transmission printing information to this block. Therefore, the address of the transfer destination may be specified prior to transfer.

The above description will be explained in more detail referring to the flow charts of FIGS. 19 and 21A-21C.

First, each flag is reset at initialization (S401). Then, data is expanded from code memory 34 to buffer memory VB11, as shown in ① in FIG. 19 (S403, S405). The expanded data is written into buffer memory VB11 till it becomes full (S409). Next, another flag i is reset (S413). The expanded data in buffer memory VB11 is automatically scaled down and written into buffer memory VB12 (② in FIG. 19, S417, S419). The scaled down expanded data is written until buffer memory VB12 becomes full (③ and ④ in FIG. 19, S421, S427). When buffer memory VB12 is full, flags i and j are set (S423, S425). When determination is made that buffer memory 12 is full (i=1) at S415, the expanded data of buffer memory VB11 is automatically scaled down and written into buffer memory VB13 (④ of FIG. 19, S445, S447). A process similar to that of buffer memory VB12 is carried out for buffer memory VB13 (S445-S449). Upon termination of data transfer from buffer memory VB11 to VB13 (S445), the data in buffer memory VB12 is transmitted to code memory 34 via the compressor (⑤ of FIG. 19, S457-S461). Upon termination of the compression, the above described operations are repeated until one page is completed (S463-S467).

If the expansion of one page ends when compression in either buffer memory VB12 or buffer VB13 terminates, (S435, S437, S463, S465), flag k is reset and flag l is set, whereby the data of the other buffer memory is compressed to complete the automatic scale-down process of one page (S439, S467).

(ii) Specification of the start address at the time of transmission printing, reception printing, and automatic scale-down The aforementioned transmission printing and reception printing will be explained. FIG. 22 is a diagram showing the printing areas of transmission information and reception information. Transmission information is for the purpose of reading out and printing from a ROM the name of the caller side, the fax number, the date of transmission and the like at the time of data transmission. Reception information is for the purpose of printing the date of reception, the facsimile number of the other party, the page number and the like.

Figure 24:
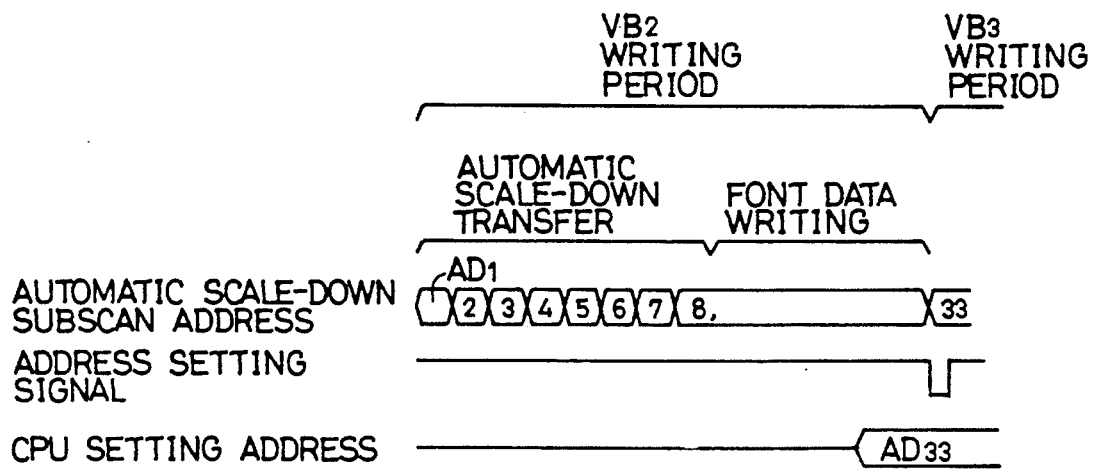

The process of transmission information printing at the time of memory transmission will be explained as an example. The compressed data is expanded and automatically scaled down according to the paper size of the destination side. The data is compressed according to the encoding method of the destination side. The operation regarding automatic scale-down is similar to that explained in the section of the automatic scale-down. If equal-scale magnification is carried out for automatic scale-down, data is expanded into buffer memory VB11, as shown in FIG. 23. (It is presumed that this buffer memory has a capacity of 32 lines.) This data is then transferred to buffer memory VB12. Eight lines of data are first transferred. The remaining 24 lines are not transferred at this time, and characters according to the transmission information are read out from the font data stored in ROM 74 of FIG. 4 to be written into buffer memory VB12. Since the character font is formed of $16 \times 24$ dots, 24 lines will be the transmission information printing area. Next, the following 32 lines are expanded into buffer memory VB11 and then transferred to buffer memory VB13. The automatic scale-down subscan address AR2BLEND provided from automatic scale-down subscan address counters 152-2 of FIG. 14 must be set to the head line of buffer memory VB13 since it is still at the 8th lines of buffer memory VB12. This is carried out by CPU 71. Because CPU 71 administers where the automatic scale-down subscan address is, a value skipping the addresses of 24 lines is provided to automatic scale-down subscan address counter 152-2. The counter value is loaded by the address setting signal to set the desired address value. This operation is shown in the timing chart of FIG. 24.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile apparatus comprising:
   printing means for printing an image of one page at a constant speed, wherein the image of one page comprises a plurality of lines and each line is printed at a predetermined interval,
   receiving means for receiving compressed image data,
   expanding means for expanding said received image data to convert the same into print data,
   storing means for storing the print data corresponding to one line among the plurality of lines,
   writing means for writing said print data converted by said expanding means into said storing means,
   transfer means to read out said print data from said storing means for transferring the same to said printing means at said predetermined interval with a predetermined transfer speed, and
   control means for controlling said writing means and said transfer means so that said writing means writes said print data into said storing means, when said transfer means is not transferring said print data into said printing means.

2. A facsimile apparatus comprising:
   printing means for printing an image of one page at a constant speed, wherein the image of one page comprises a plurality of lines and each line is printed at a predetermined timing, storing means formed of a plurality of memories of a predetermined capacity for storing print data transferred to said printing means, writing means for writing said print data into said plurality of memories at a predetermined order, and transfer means for reading out said print data from a memory of said plurality of memories which has the writing of said print data terminated for transferring the same to said printing means at said predetermined timing with a predetermined transfer speed.

3. A facsimile apparatus comprising:

printing means for printing an image of one page at a constant speed, storing means formed of a plurality of memories of a predetermined capacity for storing print data transferred to said printing means, writing means for writing said print data into said plurality of memories at a predetermined order, and transfer means for reading out said print data from a memory of said plurality of memories which has the writing of said print data terminated for transferring the same to said printing means at a predetermined transfer speed, wherein said image of one page comprises a plurality of lines of said print data, said print data being processes by one line, said facsimile apparatus further comprising, expanding means for expanding compressed image data to convert the same into print data, by referring to print data of a line prior to the currently processed line, and control means for controlling said expanding means to expand compressed image data, and said writing means to write said print data expanded by said expanding means into a memory differing from the memory storing print data referred to by said expanding means, when said transferring means is not transferring print data from said memory storing said print data of said prior line.

4. The facsimile apparatus according to claim 3, wherein each memory of said storing means comprises a memory capacity corresponding to print data of said one line.

5. The facsimile apparatus according to claim 3, wherein each memory of said storing means comprises a memory capacity corresponding to print data of a multiple of four lines.

6. The facsimile apparatus according to claim 3, wherein said storing means comprises three memories, said expanding means expands said compressed data to said print data referring to data stored in a first memory, said writing means writes said print data expanded by said expanding means into a second memory, and said transfer means transfers printed data stored in a third memory when said first and second memories are used for expansion or writing of said print data.

7. A facsimile apparatus comprising:

printing means for printing an image of one page at a constant speed, expanding means for expanding compressed image data to convert the same into print data, storing means formed of a plurality of memories for storing said expanded print data, writing means for writing print data converted by said expanding means into said plurality of memories of said storing means, detecting means for detecting that said print data written by said writing means has reached a predetermined capacity of said plurality of memories, and transfer means responsive to the detected result of said detecting means for transferring said print data stored in said plurality of memories into said printing means at a predetermined transfer speed.

8. A facsimile apparatus comprising:

storing means including first and second memories for storing image data, writing means for writing a predetermined amount at a time of an image data of one page into said first memory by a plurality of times, data processing means for reading out image data from said first memory by a data skipping procedure to provide skipped image data to transfer the same to said second memory, and for writing said skipped image data into said second memory, and transmitting means for transmitting said skipped image data from said second memory.

9. The facsimile apparatus according to claim 8, wherein said storing means further comprises a third memory, said data processing means reads out said image data from said first memory by said data skipping procedure following the transfer and writing of said skipped image data of said second memory, to transfer the same to said third memory, and to write said skipped image data into said third memory, said transmitting means initiates said data transmission from said second memory after the termination of writing said skipped image data of said second memory by said data processing means.

10. A facsimile apparatus comprising:

storing means including a plurality of memories for storing image data, writing means for writing image data into a first memory of said storing means, transfer means for transferring image dat written into said first memory by said writing means to store the same into a continuous address in a second memory, address specifying means for specifying an arbitrary address that is not in succession with an address in which the writing of said image data has already terminated in said second memory, and control means for controlling said transfer means to store said image data from the address specified in said second memory when an address is specified by said address specifying means.

11. A facsimile apparatus comprising:

storing means including a plurality of memories of a predetermined capacity for storing image data, receiving means for receiving compressed said image data, expanding means for expanding said received compressed data to convert the same into a first image data to transfer said first image data into a predetermined number of memories of said plurality of memories, printing means to read out in sequence said first image data from said predetermined number of memories for printing according to said first image data, reading means for reading an original to form a second image data, to transfer said second image data into a memory other than said memory of said predetermined numbers to which data is transferred by said expanding means, compressing means for reading and compressing said second image data from said memory, and transmitting means for transmitting image data compressed by said compressing means.

12. The facsimile apparatus according to claim 11, wherein a predetermined number of memories of said plurality of memories of said storing means stores said first image data when said receiving means and said transmitting means are operated simultaneously, and wherein the remaining memory stores said second image data when only said receiving means is operated.

* * * * *

UNITED STATES PATENT AND TRADEMARK OFFICE
CERTIFICATE OF CORRECTION

PATENT NO. : 5,317,416
DATED : May 31, 1994
INVENTOR(S) : Toshio Tsuboi, et al.

It is certified that error appears in the above-indentified patent and that said Letters Patent is hereby corrected as shown below:

In Col. 5, lines 23 and 24, delete "(indicated by in Fig. 2) to is expanded by expander 37".

In Col. 13, line 31 (Claim 3, line 17), change "processes" to --processed--.

In Col. 14, line 47 (Claim 10, line 6), change "dat" to --data--.

Signed and Sealed this

Twenty-seventh Day of September, 1994

Attest:

BRUCE LEHMAN

Attesting Officer

Commissioner of Patents and Trademarks